UNITED STATES PATENT OFFICE.

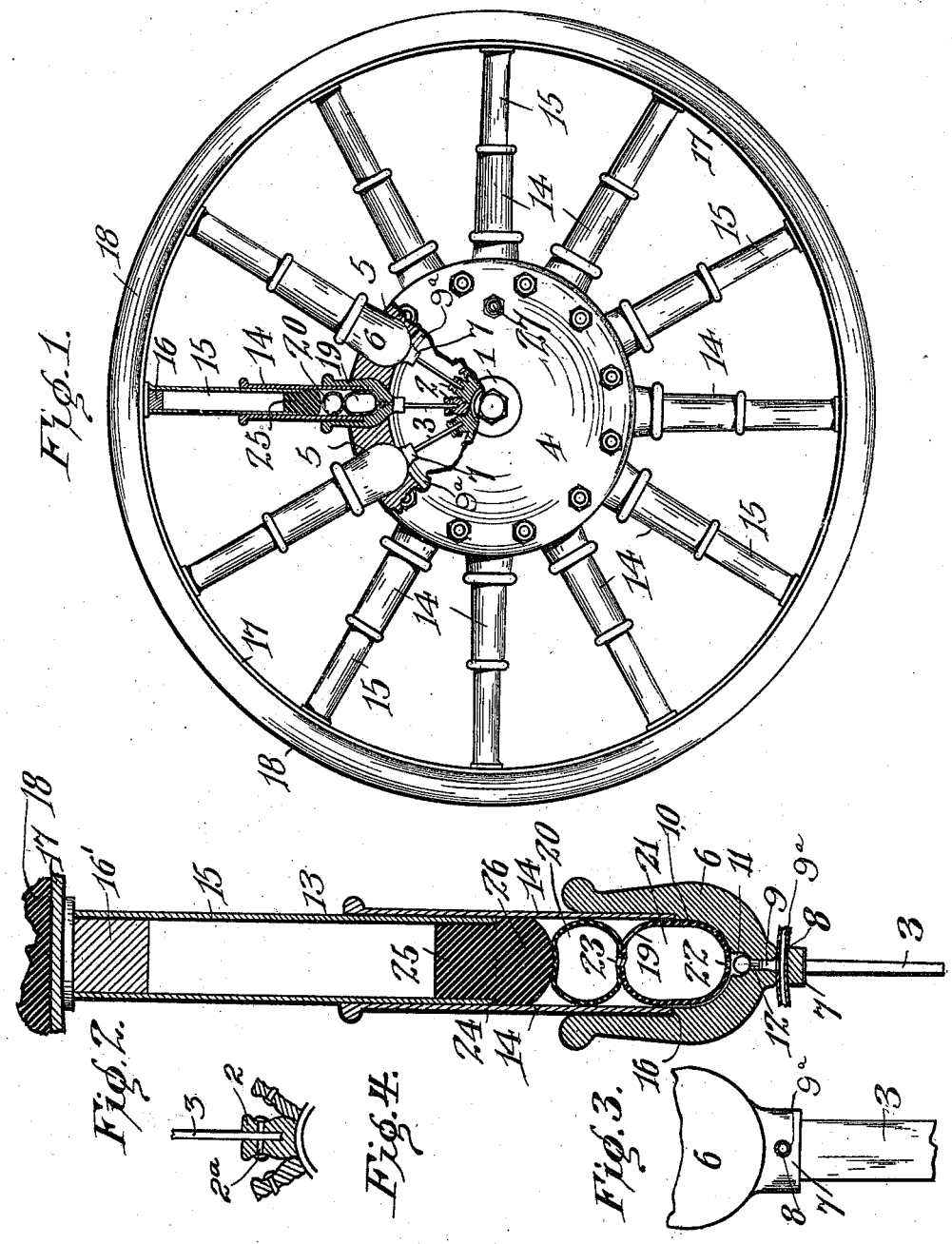

SAMUEL E. CHAPMAN, OF OAKLAND, CALIFORNIA, ASSIGNOR OF ONE-THIRD TO WILLIAM M. WOODWARD, OF FRUITVALE, CALIFORNIA.

VEHICLE-WHEEL.

963,990.

Specification of Letters Patent. Patented July 12, 1910.

Application filed October 21, 1908. Serial No. 458,912.

*To all whom it may concern:*

Be it known that I, SAMUEL E. CHAPMAN, citizen of the United States, residing at Oakland, in the county of Alameda and State of California, have invented certain new and useful Improvements in Vehicle-Wheels, of which the following is a specification, reference being had therein to the accompanying drawing.

This invention relates to vehicle-wheels, and especially to elastic, resilient or rebounding wheels, such as are employed for automobiles, driven by motors or engines, and it has for its object the production of a wheel which will have all the advantages of wheels whose rims are provided with pneumatic tires, but will not be liable to wear or punctures.

Another object of this invention is the provision of means for facilitating the inflating of the cushioning means positioned in each of the spokes.

With these and other objects in view, this invention consists of certain novel constructions, combinations, and arrangements of parts, as will be hereinafter fully described and claimed.

In the drawings: Figure 1 is a side elevation partly in section of a vehicle-wheel constructed in accordance with my invention. Fig. 2 is an enlarged, detail sectional view of one of the spokes. Fig. 3 is an elevation of that portion of the spoke which is positioned in the hub. Fig. 4 is an enlarged sectional view of the hub sockets showing the connection of the reduced portions 3 with the sockets.

Referring to the drawings by numerals, 1 designates the hub of a wheel in which is positioned a plurality of hub socket members 2, in which are secured by any suitable fastening means, as for instance, a pin $2^a$, the reduced or inner portions 3 of the spokes hereinafter described. The hub is provided on each side with a plate 4, to shield the inner portion of the hub.

The hub is provided with a plurality of sockets 5, in which are positioned a plurality of socket-members 6, and said socket-members 6 are integrally connected to the reduced extension 3 hereinbefore described. The socket-member 6 tapers toward its inner end and terminates in a reduced portion 7, in which reduced portion 7 is formed an aperture 8, through which passes a tube $9^a$, thereby allowing air to be forced into an air-chamber constituting a cushioning means hereinafter described. Communicating with the aperture 8 is a passage-way 9 leading from a socket 10 in socket-member 6. The passage-way 9 terminates in a socket-portion 11, and a valve 12 is positioned in said socket-portion 11 having the stem thereof extending into the passage-way 9. Therefore, it will be seen that when air is forced into the passage-way 9 the valve will rise, that is provided the pressure within the socket 10 is less than that without, but as soon as the pressure without is cut off the valve will readily return to its normal position, shown in Fig. 2, and prevent any escapement of air from the socket 10.

A telescoping sectional spoke 13, which comprises an inner section 14 and an outer section 15, is secured to the socket-member 6 by having the inner end of the inner section 14 positioned in the socket 10 and having the inner end thereof resting upon shoulders 16 formed in said socket. The outer section 15 is slidably mounted in the inner section 14, and the outer section is connected to the rim by means of its outer end surrounding the reduced extension 16' formed upon the rim 17, which rim is, preferably, formed of spring or flexible steel. A solid rubber tire 18 is secured to the rim 17.

Positioned in the socket 10 of the socket-member 6 is an air-cushion 19, which constitutes a primary portion 20 and an auxiliary portion 21. The auxiliary portion 21 is provided with an aperture or opening 22, so as to admit the air forced through the passage-way 9, into said portion. An aperture 23 is formed between the primary section 20 and the auxiliary section 21, so as to allow the air to pass from the auxiliary section into the primary section. A solid rubber cap 24 is secured to the inner end of the outer section 15 of the spokes and is provided with a reduced extension 25, which fits in the inner end of said section, and with an enlarged head 26 which is adapted to engage against the primary section of the air-cushion.

It will be obvious that I have provided a cushioning means positioned in a spoke which will take up any jar caused by the wheel passing over a rough surface, and perform every function of a wheel provided with a pneumatic tire, and, at the same time, prevent wear upon the same or the liability of the wheel being punctured. It will also be obvious that when the outer section 15 is forced into the inner section 14, the rubber cap or head 24 will engage the primary section 20 of the air-cushion 19 and compress the same, thereby forcing the air into the auxiliary section 21. By reason of having such a small communication or passage, as at 23, between the two sections of the air-cushion, it will be seen that the air will slowly pass through one section to the other, and thereby cause a spring action. The tube $9^a$ communicates with a valve 27, which allows air to be forced into tube $9^a$, and it will be noted that the air will only be admitted into the air-cushions which are not inflated, by reason of having the automatic valve 12 positioned in the passage-way 9.

What I claim is:

1. In a spring-wheel, the combination with a rim, a hub provided with a plurality of hub-sockets and a plurality of outer sockets, socket-sections positioned in said sockets, means integrally connected to said socket-sections and secured in said hub-sockets for holding said socket-sections in said sockets, and spokes positioned in said socket-sections and connected to said rim.

2. In a spring-wheel, the combination with a rim, of a hub provided with a plurality of sockets, socket-sections positioned in said sockets, said socket-sections provided with inwardly-extending portions, said inwardly-extending portions fixedly secured within said hub, telescoping spokes positioned in said socket-sections, air-cushions positioned in said socket-sections and adapted to coöperate with the inner end of said sections, and means positioned in said hub and connected with said air-cushion through which said air cushion may be inflated.

3. In a spring-wheel, the combination with a rim and a hub provided with sockets formed therein, socket-sections positioned in said sockets, spokes inserted in said socket-sections, and connected to the rim, each of said socket-sections provided with a reduced inner portion and with an aperture formed in said reduced portion, said socket-section provided with a socket, said socket-section provided with a passage-way constituting a communication between said aperture and said socket in said socket-section, and valve means positioned in said passage-way for only allowing air to be admitted into said socket-section.

4. In a spring-wheel, the combination with a rim, a hub, of a plurality of telescoping spokes each spoke comprising an inner and an outer section, yieldable means positioned in the inner end of said outer section, and yielding means positioned in the inner end of said inner section for exerting an outward pressure upon said first-mentioned yieldable means.

5. In a spring-wheel, the combination with a rim, a hub provided with a plurality of sockets, socket-sections positioned in said sockets, sockets formed in said socket-sections, shoulders formed in said last-mentioned sockets, of a telescoping spoke comprising an inner and outer section, the inner end of said inner section positioned in said socket-section and resting upon said shoulders formed in said socket-section, yieldable means formed upon the inner end of said outer section, yieldable means positioned in said socket-section, and adapted to engage the yieldable means positioned in the inner end of the outer section for exerting an outward pressure thereon.

6. In a spring-wheel, the combination with a rim, a hub provided with a plurality of sockets, socket-sections positioned in said sockets, of a plurality of telescoping spokes comprising inner and outer sections, one end of said inner section positioned in said socket-section, one end of said outer section positioned within the inner section, yieldable means provided with a reduced extension positioned in the inner end of said outer section, and yieldable means positioned in the inner end of said inner section for exerting an outward pressure upon said outer section.

7. In a spring-wheel, the combination with a rim of a hub provided with a plurality of sockets, socket-members positioned in said sockets, sockets formed in said socket-members, a sectional spoke positioned in said socket in each socket-member, an air-cushion positioned in said socket in each socket-member, and means positioned upon one end of one of said sections and adapted to engage said air-cushion.

8. In a spring-wheel, the combination with a rim, a hub provided with a plurality of sockets, socket-members positioned in said sockets, sockets formed in said members, of a telescoping spoke positioned in each socket-member, and an air-cushion positioned in said last mentioned sockets, said air-cushion comprising a primary and an auxiliary section, and means formed in one end of said socket-members for admitting air into said air-cushion.

9. In a spring-wheel, the combination with a rim, a hub provided with a plurality of sockets, socket-members positioned within said sockets, sockets formed in said socket-members, sectional spokes positioned in said last-mentioned sockets, an air-cushion positioned in said last-mentioned socket and provided with a centrally-disposed wall, thereby constituting a plurality of compartments, and means formed in said wall for admitting air from one compartment to the other.

10. In a spring-wheel the combination with a rim, a hub, of a plurality of socket-sections positioned in said hub, sockets formed in said socket-sections, a sectional spoke positioned in each socket, said sectional spoke comprising an inner and outer section, the inner end of said outer section positioned in the outer end of said inner section, an air-cushion positioned in said socket, each air-cushion comprising a primary and an auxiliary-portion, said primary portion smaller than said auxiliary-portion, means formed in one end of said auxiliary-section for admitting air therein, and means formed between said portions for admitting air from one portion into the other.

11. In a spring-wheel, the combination with a rim, a hub, a plurality of socket-sections positioned in said hub, a plurality of sectional telescoping spokes, one end of said spokes positioned in said socket-members and the other end connected to said rim, and yieldable means connected to one of said sections of said spokes, yieldable means within said sockets and coöperating with said yieldable means upon said last-mentioned section for exerting an outward pressure thereon.

12. In a spring-wheel, the combination with a rim, a hub provided with a plurality of sockets, a plurality of socket-members positioned in said sockets, a plurality of telescoping spokes connected to said sockets and to said rim, said socket-members tapering toward their inner end and terminating in a reduced portion, provided with an aperture, a feed tube passing through said aperture, means formed in said socket-member for admitting air into said socket, and means formed upon said hub for admitting air into said feed tube.

13. In a spring-wheel, the combination with a rim, a hub, a plurality of socket-sections positioned in said hub, a spoke connected at one end to each socket-section and at the other end to said rim, said socket-sections tapering toward their inner end constituting a reduced portion, said reduced portion provided with an inwardly-extending further reduced portion, said last mentioned reduced portion being fixedly secured within said hub.

14. In a spring-wheel, the combination with a rim, a hub, a plurality of socket-sections positioned in said hub, of a sectional spoke positioned in each socket-section and secured at one end to said rim, one end of said section provided with cushioning means, an air-cushion positioned in each socket-section, and means positioned in one end of each socket-section for admitting air into said air-cushion and preventing the escape of air therefrom.

15. In a spring-wheel, the combination with a rim and a hub provided with sockets formed therein, a socket-section positioned in each of said sockets and provided with a reduced inwardly-extending portion provided with an aperture extending therethrough, spokes inserted in said socket sections and connected to the rim, a passageway forming communication between said aperture and socket-section, and means positioned within said hub and passing through said aperture and forming communication with said passageway for admitting air into the socket-section.

In testimony whereof I hereunto affix my signature in presence of two witnesses.

SAMUEL E. CHAPMAN.

Witnesses:
C. F. La Mothe,
W. M. Woodward.